United States Patent Office 2,930,797
Patented Mar. 29, 1960

2,930,797

2-ALKYL-3-INDOLEGLYOXYLAMIDES

William C. Anthony and Merrill E. Speeter, Kalamazoo, Mich., assignors to The Upjohn Company, Kalamazoo, Mich., a corporation of Michigan No Drawing. Application November 22, 1957
Serial No. 698,029

10 Claims. (Cl. 260—319)

The present invention relates to novel organic compounds and more specifically is directed to 2-alkyl-3-indoleglyoxylamides. This application is a continuation-in-part of application Serial No. 426,301, filed April 28, 1954, now U.S. Patent 2,870,162, and application Serial No. 500,660, filed April 11, 1955, now U.S. Patent 2,825,734.

The compounds of the present invention can be represented by the following general formula:

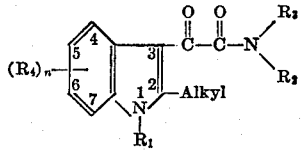

wherein $R_1$ represents hydrogen or an alkyl radical containing up to and including eight carbon atoms such as methyl, ethyl, propyl, hexyl, octyl, and the like. $R_2$ and $R_3$ represent hydrogen or an alkyl radical containing up to and including eight carbon atoms such as methyl, ethyl, propyl, hexyl, octyl, and the like, and when taken together with —N< also represent a heterocyclic amino radical such as piperidyl, pyrrolidyl, morpholinyl, and the like. $R_4$ represents halogen such as chlorine, bromine, iodine, and fluorine; hydroxy; an alkyl radical contaning up to and including eight carbon atoms such as methyl, ethyl, propyl, butyl, hexyl, octyl, and the like; an alkoxy radical containing up to and including eight carbon atoms such as methoxy, ethoxy, propoxy, butoxy, octyloxy, and the like; a benzyloxy radical containing up to and including fifteen carbon atoms such as benzyloxy, benzhydryloxy, alkylbenzyloxy, e.g., para-methylbenzyloxy, para,para'-dimethylbenzhydryloxy, halobenzyloxy, e.g., para-chlorobenzyloxy, para,para'-dichlorobenzyloxy, alkoxybenzyloxy, e.g., para-methoxybenzyloxy, para, para'-dimethoxybenzhydryloxy, and the like; and an acyloxy radical wherein the acyl substituent is from an organic carboxylic acid containing up to and including eight carbon atoms such as formyloxy, acetoxy, propionoxy, caprylyloxy, benzoxy, and the like, $n$ is an integer from zero to four, inclusive, and when $n$ is greater than one the $R_4$'s can be alike or different. When $n$ is less than four, of course, it is understood that the remaining benzene-ring positions are not substituted.

The 2-position alkyl group contains up to and includes eight carbon atoms such as methyl, ethyl, propyl, butyl, hexyl, octyl, and the like.

The 2-alkyl-3-indoleglyoxylamides of the present invention possess valuable therapeutic properties; e.g., they are drug potentiators and tranquillizing agents and also can be used to prolong the activity of anesthetics, analgesics, sedatives, and hypnotics.

Illustratively, the compounds of this invention have shown surprisingly high activity as sleep potentiators and have proved to be far more effective with respect to this activity than those compounds wherein the 2-alkyl group is lacking. A comparison of the activity of the compounds of the present invention with compounds which are not substituted in the 2-position, i.e., 2-hydro-3-indoleglyoxylamides, is shown in the table below and clearly demonstrates the superiority of the compounds of the present invention.

The compounds were subjected to the standard hexobarbital sleeping test (introperitoneal administration to mice) at dosages representing varying percentages of the predetermined $LD_{50}$ (determined intraperitoneally in mice) and the results recorded as percent increases in sleeping time. For example, Compound I at a dosage of 20 percent of its $LD_{50}$ showed a 2383 percent increase in hexobarbital sleeping time. It is to be noted that Compounds V and VI, i.e., the 2-hydro-3-indoleglyoxylamides, are far inferior as sleep potentiators when compared to the compounds of the present invention.

TABLE

| Compound | Percent Increase in Sleeping Time | | | |
|---|---|---|---|---|
| | Percent of $LD_{50}$ | | | |
| | 20 | 10 | 5 | 2.5 |
| 1-ethyl-2,N,N-trimethyl-3-indoleglyoxylamide: | | | | |
| I | 2,383 | 748 | 707 | 436 |
| 1,2,N,N-tetramethyl-3-indoleglyoxylamide: | | | | |
| II | 1,809 | 580 | 269 | 304 |
| 2-methyl-N,N-diethyl-3-indoleglyoxylamide: | | | | |
| III | 1,000 | 1,028 | 593 | 313 |
| 2,N,N-trimethyl-3-indoleglyoxylamide: | | | | |
| IV | 1,106 | 560 | 531 | 136 |
| N,N-dimethyl-3-indoleglyoxylamide: | | | | |
| V | 370 | 140 | 111 | |
| 3-indoleglyoxylamide: | | | | |
| VI | 381 | 247 | 183 | 127 |

The novel compounds of this invention can be combined with solid or liquid pharmaceutical carriers and formulated as tablets, powder packets, or capsules, or dissolved or suspended in suitable solvents, for oral or parenteral administration.

The 1-unsubstituted-2-alkyl-3-indoleglyoxylamides, i.e., 1-hydro-2-alkyl-3-indoleglyoxylamides of the present invention can also be employed for the preparation of pharmacologically active tryptamines, i.e., 1-hydro-2-alkyl-3-(2-aminoethyl)-indoles, which is accomplished by reducing 1-hydro-2-alkyl-3-indoleglyoxylamides with lithium aluminum hydride in the presence of an inert solvent such as ether, tetrahydrofuran, and the like. For example, serotonin-like compounds, i.e., 1-hydro-2-alkyl-4-, 5-, 6-, or 7-hydroxy-3-(2-aminoethyl)-indoles, can be prepared by reduction of 1-hydro-2-alkyl-4-, 5-, 6-, or 7-hydroxy-3-indoleglyoxylamides with lithium aluminum hydride. The 1-hydro-2-alkyl-4-, 5-, 6-, or 7-hydroxy-3-indoleglyoxylamides are advantageously prepared by debenzylating the corresponding 1-hydro-2-alkyl-4-, 5-, 6-, or 7-benzyloxy-3-indoleglyoxylamides. The debenzylation can be readily accomplished by employing the procedure disclosed in U.S. Patent 2,708,197.

Alternatively, serotonin-like compounds can be prepared by reducing 1-hydro-2-alkyl-4-, 5-, 6-, or 7-benzyloxy-3-indoleglyoxylamides with lithium aluminum hydride to produce 1-hydro-2-alkyl-4-, 5-, 6-, or 7-benzyloxy-3-(2-aminoethyl)-indoles and debenzylating as discussed above.

Similarly, 1-hydro-2-alkyl-4-, 5-, 6-, or 7-acyloxy-3-indoleglyoxylamides can also be used to produce serotonin-like compounds by reduction with lithium aluminum hydride, which reaction results in the reduction of the carbonyl groups of the glyoxylamide fragment to methylene groups and also in the concomitant conversion of the acyloxy radical to a hydroxy radical.

In addition, the tryptamines produced from the 1-hydro-2-alkyl-3-indoleglyoxylamides of the present invention have demonstrated potent depressor activity.

The 1,2-dialkyl-3-indoleglyoxylamides of the present invention can be employed for the preparation of 1,2-dialkyl-3-(2-amino-1-hydroxyethyl)-indoles. The preparation of the latter compounds is accomplished by reduction of 1,2-dialkyl-3-indoleglyoxylamides with lithium aluminum hydride in the presence of an inert solvent. The reduction of the 1,2-dialkyl-3-indoleglyoxylamides, in contrast to the reduction of the 1-hydro-2-alkyl-3-indoleglyoxylamides, results in the preparation of compounds having a 2-amino-1-hydroxyethyl radical, i.e.,

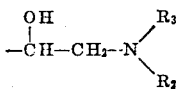

attached to the 3-position of the indole nucleus. The 1-position substituent apparently influences the reaction so that the lithium aluminum hydride reduction results in the partial reduction of the starting 3-position side chain, i.e.,

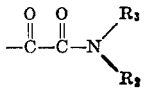

These compounds possess depressor activity. Moreover, the 1,2-dialkyl-3-(2-amino-1-hydroxyethyl)-indoles can also be reacted with fluosilicic acid to form fluosilicate salts which in dilute aqueous solution are effective mothproofing agents as more fully disclosed in U.S. Patents 2,075,355 and 1,915,334.

The compounds of the present invention can be prepared by reacting a 2-alkylindole with an oxalyl halide to produce a 2-alkyl-3-indoleglyoxylyl halide and reacting the latter compound with ammonia or a primary or a secondary amine to produce a 2-alkyl-3-indoleglyoxylamide. Ammonia is employed to produce a primary amide and primary and secondary amines to produce secondary and tertiary amides, respectively. Primary and secondary amines which can be employed include methylamine, amylamine, octylamine, diethylamine, diisopropylamine, morpholine, pyrrolidine, piperidine, and the like.

The glyoxylation is carried out in the presence of an inert organic solvent, such as ether, petroleum ether, methylcyclohexane, dioxan, and the like. Aromatic hydrocarbons, such as benzene, and the like, can also be employed when the acid halide is not to be isolated. Stoichiometric quantities (i.e., equimolar) are advantageously employed. The reaction is advantageously conducted at about 25 degrees centigrade although other temperatures between about ten degrees centigrade and about the boiling point of the solvent employed can also be utilized. The reaction is generally completed between about fifteen minutes and about eight hours, longer periods being required for lower reaction temperatures and/or less reactive indoles. The reaction mixture generally reddens, but soon decolorizes, whereupon a precipitate generally begins to form. After standing between about one and about eight hours, the reaction mixture is cooled to about zero degrees centigrade and the 2-alkyl-3-indoleglyoxylyl halide precipitate can be recovered by filtration.

The conversion of 2-alkyl-3-indoleglyoxylyl halides to 2-alkyl-3-indoleglyoxylamides is advantageously conducted at a temperature between about zero degrees and about 100 degrees centigrade, preferably at about 25 degrees centigrade, and is usually completed between about thirty minutes and about five hours, the longer reaction period being required at the lower temperatures. The reaction is advantageously carried out in the presence of inert solvents such as aliphatic hydrocarbons, aromatic hydrocarbons, ketones, and ethers, with benzene being preferred, but the reaction can also be completed without a solvent.

The various substituted indoles employed in the preparation of the 2-alkyl-3-indoleglyoxylyl halides can be prepared by one of the following procedures:

(1) The starting 2-alkylindoles containing a 4-, 5-, 6-, or 7-benzyloxy substituent can be prepared by the procedure more fully disclosed in U.S. Patent 2,698,345 and in British Patent 720,584. The procedure includes the following steps:

(a) Benzylating 3 - hydroxy - 2 - nitrobenzaldehyde (Hodgson et al., J. Chem. Soc. 1935, 877), 4-hydroxy-2-nitrobenzaldehyde (Sachs, Ber. 39, 2758), 5-hydroxy-2-nitrobenzaldehyde (Beer et al., J. Chem. Soc. 1948, 1605), or 6-hydroxy-2-nitrobenzaldehyde (Beer et al., supra) with a benzyl halide such as benzyl chloride, to produce the corresponding benzyloxy-2-nitrobenzaldehyde; and (b) Reacting the benzyloxy-2-nitrobenzaldehyde with a 1-nitroalkane, other than nitromethane, in the presence of an alkali-metal hydroxide and at a temperature between about zero and about minus forty degrees centigrade, preferably about minus fifteen degrees centigrade, to produce a benzyloxy-2-nitro-α-[1-(1-nitroalkyl)]-benzyl alcohol alkali-metal salt, and thereafter acidifying the thus-produced salt to yield the benzyloxy-2-nitro-α-[1-(1-nitroalkyl)]-benzyl alcohol; and (c) Dehydrating the benzyloxy-2-nitro-α-[1-(1-nitroalkyl)]-benzyl alcohol by reacting the alcohol with an aliphatic acid anhydride, e.g., acetic anhydride, at a temperature between about fifty and about 150 degrees centigrade, preferably about eighty degrees centigrade, to produce a benzyloxy-β,2-dinitro-β-alkylstyrene; and (d) Subjecting the benzyloxy-β,2-dinitro-β-alkylstyrene to reductive cyclization by reacting the styrene with powdered iron in an organic acid medium, such as acetic, propionic, butyric, or the like, at a temperature between about 50 and about 120 degrees centigrade to produce 2-alkyl-7-benzyloxyindole, 2-alkyl-6-benzyloxyindole, 2-alkyl-5-benzyloxyindole, and 2-alkyl-4-benzyloxyindole, respectively.

The 2-alkylindoles containing a 4-, 5-, 6-, or 7-alkoxy substituent can be prepared by alkylating a hydroxy-2-nitrobenzaldehyde and then nitroalkylating, dehydrating, and reductively cyclizing as described above.

The 2-alkyl-5-alkoxyindoles can also be prepared by the procedure outlined by Beer et al. (J. Chem. Soc. 1951, 2029) who show the preparation of 2-methyl-5-methoxyindole from ethyl 5-methoxy-2-methylindole-3-carboxylate.

Similarly the 2-alkyl-4-, 5-, 6-, or 7-haloindoles can be prepared by nitroalkylating a properly substituted halo-2-nitrobenzaldehyde, dehydrating and reductively cyclizing as described above. The 2-methyl-4-, 5-, 6-, or 7-haloindoles can also be prepared by the procedure disclosed in U.S. Patent 2,607,779 which involves reacting an N-(2-chloroallyl)-arylamine with hydrogen fluoride.

The starting 2-alkylindoles containing a 4-, 5-, 6-, or 7-benzyloxy substituent can also be prepared by the procedure outlined in U.S. Patent 2,707,187. For example, 2-alkyl-5-benzyloxyindole is prepared by benzylating 2-alkyl-5-hydroxy-3-carbalkoxyindole to prepare 2-alkyl-5-benzyloxy-3-carbalkoxyindole, subjecting the latter compound to hydrolysis and decarboxylation by reacting with an aqueous solution of an alkali-metal hydroxide or carbonate, refluxing the mixture, and extracting with an organic solvent such as ether.

(2) The 2-alkyl-5-acyloxyindoles are prepared in the manner disclosed by Beer et al., supra, who show the preparation of 2-methyl-5-acetoxyindole starting with 2-nitro-5-hydroxybenzaldehyde. Other 2-alkyl-5-acyloxyindoles can be prepared using the corresponding acylating agent. The 2-alkylindoles containing a 4-, 6-, or 7-acyloxy substituent are prepared in the manner disclosed by Beer et al., supra, utilizing the corresponding 2-nitro-6-hydroxybenzaldehyde, 2-nitro-4-hydroxybenzaldehyde and 2-nitro-3-hydroxybenzaldehyde to prepare 2-alkyl-4-acyloxyindole, 2-alkyl-6-acyloxyindole, and 2-alkyl-7-acyloxyindole, respectively.

(3) The preparation of 2-alkylindoles, unsubstituted in 4-, 5-, 6-, or 7-position, is advantageously carried out by various procedures, e.g., the Fischer synthesis, involving the cyclization of arylhydrazones of methyl alkyl ketones, is readily applicable to the preparation of 2-substituted indoles. Thus, e.g., 2-methylindole can be prepared by cyclizing the phenylhydrazone of acetone.

(4) The 1,2-dialkylindoles are advantageously prepared by the process disclosed by Baker, J. Chem. Soc. 958, 1940, wherein the 1-alkyl radical is added by reacting a 2-alkylindole or a 2-alkyl-3-indoleglyoxylamide with an alkyl halide in the presence of an alkali-metal alkoxide.

Alternatively, the 1-alkyl substituent can also be added to the 2-alkyl-3-indoleglyoxylamide by reacting the latter with an alkylating agent in the presence of a metal carbonate catalyst. The reaction is carried out in the presence of an inert solvent such as ethanol. Metal carbonate catalysts which can be employed include the alkaline-earth metal carbonates as well as the alkali-metal carbonates. Alkylating agents include ethyl iodide, methyl iodide, hexyl iodide, and the like. The alkylation is advantageously conducted at a temperature between about zero and about 150 degrees centigrade, preferably between about 55 and about 80 degrees centigrade.

(5) The starting 2-alkylindoles containing a 4-, 5-, 6-, or 7-alkyl substituent can be prepared utilizing the procedures disclosed by Marion et al., Can. J. Research 25B, 1-13, 1947.

Representative 2-alkylindoles which can be employed herein include the following:

2-methylindole,
1,2-dimethylindole,
2,6-dimethylindole,
1-ethyl-2-methylindole,
2-tertiary-butylindole,
2-ethyl-5-benzyloxyindole,
2-propyl-5-methoxyindole,
2-methyl-5-methoxyindole,
2-methyl-7-methoxyindole,
1,2-dipropyl-6-benzyloxyindole,
1,2-dibutyl-5-acetoxyindole,
2-butyl-6-ethoxyindole,
1-methyl-2-propyl-5-benzyloxyindole,
1-methyl-2-ethyl-6-ethoxyindole,
1-hexyl-2-ethyl-5-benzhydryloxyindole,
1,2-dipropyl-5-propionyloxyindole,
2-hexylindole,
2-ethylindole,
2-propylindole,
2,5-diethylindole,
1,2,5-tributylindole,
2-methyl-5-acetoxyindole,
2-amyl-6-acetoxyindole,
1-butyl-2-ethyl-6-butyroxyindole,
2-ethyl-5-(para-chlorobenzyloxy)-indole,
2,4,7-trimethylindole,
2-methyl-5,7-dichloroindole,
2-methyl-5-fluoroindole,
2-propyl-6-chloroindole,
2-methyl-5-chloroindole, and the like.

The following examples are illustrative of the process and products of the present invention, but are not to be construed as limiting.

EXAMPLE 1

2,N,N-trimethyl-3-indoleglyoxylamide

A solution of 25 grams of 2-methylindole and 1500 milliliters of anhydrous ether was cooled to between 15 and 20 degrees centigrade; 25 milliliters of oxalyl chloride was then added in a steady stream. The mixture was held between 15 and 20 degrees centigrade for one hour and filtered. The solid was washed with Skellysolve B (mixture of hexanes having a boiling range of 140 to 160 degrees Fahrenheit) and added to two liters of benzene. Dimethylamine was rapidly passed into the mixture for two hours. The excess dimethylamine was expelled with air and the mixture was acidified with hydrochloric acid and filtered. The solid was thoroughly washed with water and recrystallized from thirty percent alcohol to yield 22.7 grams (44 percent) of 2,N,N-trimethyl-3-indoleglyoxylamide which melted between 169 and 170 degrees centigrade.

*Analysis.*—Calcd. for $C_{13}H_{14}N_2O_2$: C, 67.80; H, 6.12; N, 12.16. Found: C, 67.79; H, 6.07; N, 12.83.

EXAMPLE 2

1-ethyl-2,N,N-trimethyl-3-indoleglyoxylamide

A mixture of twenty grams of 2,N,N-trimethyl-3-indoleglyoxylamide, 18.7 grams of ethyl iodide, 16.5 grams of potassium carbonate and 100 milliliters of absolute ethanol was refluxed for twenty hours. The alcohol was removed by distillation, the residue was slurried in water, and the solid material was recovered by filtration. The solid was recrystallized from a solution of fifty milliliters of alcohol and 175 milliliters of water to give 16.3 grams (78.9 percent) of 1-ethyl-2,N,N-trimethyl-3-indoleglyoxylamide which melt between 107 and 109.5 degrees centigrade.

*Analysis.*—Calcd. for $C_{15}S_{18}N_2O_2$: C, 69.74; H, 7.02; N, 10.84. Found: C, 69.35; H, 6.97; N, 10.84.

EXAMPLE 3

2-methyl-N,N-diethyl-3-indoleglyoxylamide

In the same manner as shown in Example 1, 2-methyl-N,N-diethyl-3-indoleglyoxylamide was prepared using diethylamine in lieu of dimethylamine. The compound melted between 171 and 174 degrees centigrade.

*Analysis.*—Calcd. for $C_{15}H_{18}N_2O_2$: C, 69.74; H, 7.02; N, 10.84. Found: C, 69.36; H, 6.91; N, 11.39.

EXAMPLE 4

1,2-dimethyl-N,N-diethyl-3-indoleglyoxylamide

In the same manner as shown in Example 2, 1,2-dimethyl-N,N-diethyl-3-indoleglyoxylamide was prepared using 2-methyl-N,N-diethyl-3-indoleglyoxylamide and methyl iodide in lieu of 2,N,N-trimethyl-3-indoleglyoxylamide and ethyl iodide. The compound melted between 102 and 103.5 degrees centigrade.

*Analysis.*—Calcd. for $C_{16}H_{20}N_2O_2$: C, 70.55; H, 7.40; N, 10.28. Found C, 70.70; H, 7.48; N, 9.67.

EXAMPLE 5

1,2,N,N-tetramethyl-3-indoleglyoxylamide

In the same manner as shown in Example 1, 1,2,N,N-tetramethyl-3-indoleglyoxylamide was prepared using 1,2-dimethylindole in lieu of 2-methylindole. The compound melted between 127 and 129 degrees centigrade.

*Analysis.*—Calcd. for $C_{14}H_{16}NO_2$: C, 68.82; H, 6.60; N, 11.47. Found: C, 68.81; H, 6.37; N, 11.33.

EXAMPLE 6

2,N,N-trimethyl-5-benzyloxy-3-indoleglyoxylamide

A solution of 13.5 grams of 2-methyl-5-benzyloxyindole (U.S. Patent 2,707,187) and 300 milliliters of anhydrous ether was cooled to twenty degrees centigrade and thirteen milliliters of oxalyl chloride was added. After one hour the mixture was filtered. The solid was washed with Skellysolve B and immediately added to a stirred solution of sixty milliliters of anhydrous dimethylamine and one liter of benzene. The mixture was stirred for ten hours and concentrated under reduced pressure. The residue was slurried with water and the solid was recovered by filtration and thoroughly washed with water. After three recrystallizations from 400 milliliters of sixty percent alcohol the product, 2,N,N-trimethyl-5-benzyloxy-3-indoleglyoxylamide, weighed 9.6 grams (50 percent) and melted between 149 and 150 degrees centigrade.

*Analysis.*—Calcd. for $C_{20}H_{20}N_2O_3$: C, 71.40; H, 5.99; N, 8.33. Found: C, 71.39; H, 6.22; N, 8.33.

EXAMPLE 7

*1-ethyl-2,N,N-trimethyl-5-benzyloxy-3-indoleglyoxylamide*

A mixture of 4.0 grams of 2,N,N-trimethyl-5-benzyloxy-3-indoleglyoxylamide, 3.0 grams of ethyl iodide, 3.0 grams of anhydrous potassium carbonate and fifteen milliliters of ethanol was refluxed for ten hours. The mixture was concentrated and the residue was slurried in water. The solid was recovered by filtration and was recrystallized twice from dilute alcohol. The solid, 1-ethyl -2,N,N-trimethyl-5-benzyloxy-3-indoleglyoxylamide, weighed 3.8 grams (97.4 percent) and melted betwen 141 and 143 degrees centigrade.

*Analysis.*—Calcd. for $C_{22}H_{24}N_2O_3$: C, 72.50; H, 6.63; N, 7.69. Found: C, 71.96; H, 6.16; N, 7.86.

EXAMPLE 8

*2-methyl-5-benzyloxy-3-indoleglyoxylic acid pyrrolidide*

In the same manner as shown in Example 6, 2-methyl-5-benzyloxy-3-indoleglyoxylic acid pyrrolidide was prepared using pyrrolidine in lieu of dimethylamine.

EXAMPLE 9

*1-propyl-2-methyl-5-benzyloxy-3-indoleglyoxylic acid pyrrolidide*

In the same manner as shown in Example 7, 1-propyl-2-methyl-5-benzyloxy-3-indoleglyoxylic acid pyrollidide was prepared using 2-methyl-5-benzyloxy-3-indoleglyoxylic acid pyrrolidide and propyl iodide in lieu of 2,N,N-trimethyl-5-benzyloxy - 3-indoleglyoxylamide and ethyl iodide.

EXAMPLE 10

*1-ethyl-2-methyl-3-indoleglyoxylamide*

In the same manner as shown in Example 1, 1-ethyl-2-methyl-3-indoleglyoxylamide was prepared using 1-ethyl-2-methylindole (Ann. 236, 151, 1886) and ammonia in lieu of 2-methylindole and dimethylamine.

EXAMPLE 11

*2-tertiary-butyl-N,N-diethyl-3-indoleglyoxylamide*

In the same manner as shown in Example 1, 2-tertiary-butyl-N,N-diethyl-3-indoleglyoxylamide was prepared using 2-tertiary-butylindole (Rec. trav. chim., 63, 123, 1944) and diethylamine in lieu of 2-methylindole and dimethylamine.

EXAMPLE 12

*2,N-dipropyl-3-indoleglyoxylamide*

In the same manner as shown in Example 1, 2,N-dipropyl-3-indoleglyoxylamide was prepared using 2-propylindole (C.A. 31, 1026) and propylamine in lieu of 2-methylindole and dimethylamine.

EXAMPLE 13

*1,2,N-tripropyl-3-indoleglyoxylamide*

In the same manner as shown in Example 2, 1,2,N-tripropyl-3-indoleglyoxylamide was prepared using 2,N-dipropyl-3-indoleglyoxylamide and propyl iodide in lieu of 2,N,N-trimethyl-3-indoleglyoxylamide and ethyl iodide.

EXAMPLE 14

*2,4,7,N-tetramethyl-3-indoleglyoxylamide*

In the same manner as shown in Example 1, 2,4,7,N-tetramethyl-3-indoleglyoxylamide was prepared using 2,4,7-trimethylindole (J. Org. Chem. 2, 235, 1937) and methylamine in lieu of 2-methylindole and dimethylamine.

EXAMPLE 15

*2-methyl-5,6-dimethoxy-N-ethyl-3-indoleglyoxylamide*

In the same manner as shown in Example 1, 2-methyl-5,6-dimethoxy-N-ethyl-3-indoleglyoxylamide was prepared using 2-methyl-5,6-dimethoxyindole (J. Proc. Roy. Soc. N.S. Wales 63, 168, 1930) and ethylamine in lieu of 2-methylindole and dimethylamine.

EXAMPLE 16

*1-propyl-2-methyl-5,6-dimethoxy-N-ethyl-3-indoleglyoxylamide*

In the same manner as shown in Example 2, 1-propyl-2-methyl-5,6-dimethoxy-N - ethyl - 3 - indoleglyoxylamide was prepared using 2-methyl-5,6-dimethoxy-N-ethyl-3-indoleglyoxylamide and propyl iodide in lieu of 2,N,N-trimethyl-3-indoleglyoxylamide and ethyl iodide.

EXAMPLE 17

*2-methyl-5-acetoxy-N,N-dibutyl-3-indoleglyoxylamide*

In the same manner as shown in Example 1, 2-methyl-5-acetoxy-N,N-dibutyl-3-indoleglyoxylamide was prepared using 2-methyl-5-acetoxyindole (J. Chem. Soc. 1605, 1948) and dibutylamine in lieu of 2-methylindole and dimethylamine.

EXAMPLE 18

*1-octyl-2-methyl-5-acetoxy-N,N-dibutyl-3-indoleglyoxylamide*

In the same manner as shown in Example 2, 1-octyl-2-methyl-5-acetoxy-N,N-dibutyl-3-indoleglyoxylamide was prepared using 2-methyl-5-acetoxy-N,N-dibutyl-3-indoleglyoxylamide and octyl iodide in lieu of 2,N,N-trimethyl-3-indoleglyoxylamide and ethyl iodide.

EXAMPLE 19

*2,N-dihexyl-5-benzyloxy-3-indoleglyoxylamide*

In the same manner as shown in Example 1, 2,N-dihexyl-5-benzyloxy-3-indoleglyoxylamide was prepared using 2-hexyl-5-benzyloxyindole (U.S. 2,707,187) and hexylamine in lieu of 2-methylindole and dimethylamine.

EXAMPLE 20

*1,2,N-trihexyl-5-benzyloxy-3-indoleglyoxylamide*

In the same manner as shown in Example 2, 1,2,N-trihexyl-5-benzyloxy-3-indoleglyoxylamide was prepared using 2,N-dihexyl-5-benzyloxy-3-indoleglyoxylamide and hexyl iodide in lieu of 2,N,N-trimethyl-3-indoleglyoxylamide and ethyl iodide.

EXAMPLE 21

*2,N,N-triethyl-6-benzhydryloxy-3-indoleglyoxylamide*

Following the procedure disclosed in British Patent 720,584, 2-ethyl-6-benzhydryloxyindole was prepared by benzylating 2-nitro-4-hydroxybenzaldehyde with benzhydryl chloride, nitroalkylating with 1-nitropropane, dehydrating, and reductively cyclizing with powdered iron and acetic acid.

In the same manner as shown in Example 1, 2,N,N-triethyl-6-benzhydryloxy - 3 - indoleglyoxylamide was prepared using 2-ethyl-6-benzhydryloxyindole and diethylamine in lieu of 2-methylindole and dimethylamine.

EXAMPLE 22

*1-butyl-2,N,N-triethyl-6-benzhydryloxy-3-indoleglyoxylamide*

In the same manner as shown in Example 2, 1-butyl-2,N,N-triethyl-6-benzhydryloxy-3-indoleglyoxylamide was prepared using 2,N,N-triethyl-6-benzhydryloxy-3-indoleglyoxylamide and butyl iodide in lieu of 2,N,N-trimethyl-3-indoleglyoxylamide and ethyl iodide.

EXAMPLE 23

*2,N,N-tributyl-6-butoxy-3-indoleglyoxylamide*

2-butyl-6-butoxyindole was prepared by alkylating 2-nitro-4-hydroxybenzaldehyde with butyl iodide, reacting the thus produced 2-nitro-4-butoxybenzaldehyde with 1-nitropentane, dehydrating the thus-produced alcohol, and reductively cyclizing the resulting 4-butoxy-$\beta$,2-dinitro-$\beta$-butylstyrene.

In the same manner as shown in Example 1, 2,N,-tributyl-6-butoxy-3-indoleglyoxylamide was prepared using 2-butyl-6-butoxyindole and dibutylamine in lieu of 2-methylindole and dimethylamine.

EXAMPLE 24

*1-methyl-2,N,N-tributyl-6-butoxy-3-indoleglyoxylamide*

In the same manner as shown in Example 2, 1-methyl-2,N,N-tributyl-6-butoxy-3-indoleglyoxylamide was prepared using 2,N,N-tributyl-6-butoxy-3-indoleglyoxylamide and methyl iodide in lieu of 2,N,N-trimethyl-3-indoleglyoxylamide and ethyl iodide.

EXAMPLE 25

*2-ethyl-N,N-dipropyl-5-propoxy-3-indoleglyoxylamide*

2-ethyl-5-propoxyindole was prepared by alkylating 2-nitro-5-hydroxybenzaldehyde with propyl iodide, reacting the thus-produced 2-nitro-5-propoxybenzaldehyde with 1-nitropropane, dehydrating the thus-produced alcohol, and reductively cyclizing the resulting 5-propoxy-$\beta$,2-dinitro-$\beta$-ethylstyrene.

In the same manner as shown in Example 1, 2-ethyl-N,N-dipropyl-5-propoxy-3-indoleglyoxylamide was prepared using 2-ethyl-5-propoxyindole and dipropylamine in lieu of 2-methylindole and dimethylamine.

EXAMPLE 26

*1,2-diethyl-N,N-dipropyl-5-propoxy-3-indoleglyoxylamide*

In the same manner as shown in Example 2, 1,2-diethyl-N,N-dipropyl-5-propoxy-3-indoleglyoxylamide was prepared using 2-ethyl-N,N-dipropyl-5-propoxy-3-indoleglyoxylamide in lieu of 2,N,N-trimethyl-3-indoleglyoxylamide.

EXAMPLE 27

*2-hexyl-N-propyl-7-ethoxy-3-indoleglyoxylamide*

2-hexyl-7-ethoxyindole was prepared by alkylating 2-nitro-3-hydroxybenzaldehyde with diethyl sulfate, reacting the thus-produced 2-nitro-3-ethoxybenzaldehyde with 1-nitroheptane, dehydrating the thus-produced alcohol, and reductively cyclizing the resulting 3-ethoxy-$\beta$,2-dinitro-$\beta$-hexylstyrene.

In the same manner as shown in Example 1, 2-hexyl-N-propyl-7-ethoxy-3-indoleglyoxylamide was prepared using 2-hexyl-7-ethoxyindole and propylamine in lieu of 2-methylindole and dimethylamine.

EXAMPLE 28

*1,2-dihexyl-N-propyl-7-ethoxy-3-indoleglyoxylamide*

In the same manner as shown in Example 2, 1,2-dihexyl-N-propyl-7-ethoxy-3-indoleglyoxylamide was prepared using 2-hexyl-N-propyl-7-ethoxy-3-indoleglyoxylamide and hexyl iodide in lieu of 2,N,N-trimethyl-3-indoleglyoxylamide and ethyl iodide.

EXAMPLE 29

*2,N,N-trihexyl-6-butyryloxy-3-indoleglyoxylamide*

Using the procedure of Beer et al. (J. Chem. Soc. 1948, 1605), 2-hexyl-6-butyryloxyindole was prepared by using 1-nitroheptane, 2-nitro-4-hydroxybenzaldehyde, and butyric anhydride as the reactants.

In the same manner as shown in Example 1, 2,N,N-trihexyl-6-butyryloxy-3-indoleglyoxylamide was prepared using 2-hexyl-6-butyryloxyindole and dihexylamine in lieu of 2-methylindole and dimethylamine.

EXAMPLE 30

*1,2,N,N-tetrahexyl-6-butyryloxy-3-indoleglyoxylamide*

In the same manner as shown in Example 2, 1,2,N,N-tetrahexyl-6-butyryloxy-3-indoleglyoxylamide was prepared using 2,N,N-trihexyl-6-butyryloxy-3-indoleglyoxylamide and hexyl iodide in lieu of 2,N,N-trimethyl-3-indoleglyoxylamide and ethyl iodide.

EXAMPLE 31

*2-ethyl-N,N-dibutyl-6-propionoxy-3-indoleglyoxylamide*

Using the procedure of Beer et al. (J. Chem. Soc. 1948, 1605), 2-ethyl-6-propionoxyindole was prepared by using 1-nitropropane, 2-nitro-4-hydroxybenzaldehyde, and propionic anhydride as the reactants.

In the same manner as shown in Example 1, 2-ethyl-N,N-dibutyl-6-propionoxy-3-indoleglyoxylamide was prepared using 2-ethyl-6-propionoxyindole and dibutylamine in lieu of 2-methylindole and dimethylamine.

EXAMPLE 32

*1,2-diethyl-N,N-dibutyl-6-propionoxy-3-indoleglyoxylamide*

In the same manner as shown in Example 2, 1,2-diethyl-N,N-dibutyl-6-propionoxy-3-indoleglyoxylamide was prepared using 2-ethyl-N,N-dibutyl-6-propionoxy-3-indoleglyoxylamide in lieu of 2,N,N-trimethyl-3-indoleglyoxylamide.

EXAMPLE 33

*2-propyl-N-ethyl-4-benzoxy-3-indoleglyoxylamide*

Using the procedure of Beer et al. (J. Chem. Soc. 1948, 1605), 2-propyl-4-benzoxyindole was prepared by using 1-nitrobutane, 2-nitro-6-hydroxybenzaldehyde, and benzoic anhydride as the reactants.

In the same manner as shown in Example 1, 2-propyl-N-ethyl-4-benzoxy-3-indoleglyoxylamide was prepared using 2-propyl-4-benzoxyindole and ethylamine in lieu of 2-methylindole and dimethylamine.

EXAMPLE 34

*1,2-dipropyl-N-ethyl-4-benzoxy-3-indoleglyoxylamide*

In the same manner as shown in Example 2, 1,2-dipropyl-N-ethyl-4-benzoxy-3-indoleglyoxylamide was prepared using 2-propyl-N-ethyl-4-benzoxy-3-indoleglyoxylamide and propyl iodide in lieu of 2,N,N-trimethyl-3-indoleglyoxylamide and ethyl iodide.

EXAMPLE 35

*2,6,N-tripropyl-3-indoleglyoxylamide*

2,6-dipropylindole was prepared using the procedure shown by Marion et al., Can J. Research 25B, 1–13, 1947.

In the same manner as shown in Example 1, 2,6,N-tripropyl-3-indoleglyoxylamide was prepared using 2,6-dipropylindole and propylamine in lieu of 2-methylindole and dimethylamine.

EXAMPLE 36

*1,2,6,N-tetrapropyl-3-indoleglyoxylamide*

In the same manner as shown in Example 2, 1,2,6,N-tetrapropyl-3-indoleglyoxylamide was prepared using 2,6,N-tripropyl-3-indoleglyoxylamide and propyl bromide

Example 37

*2,5-diethyl-N,N-dimethyl-3-indoleglyoxylamide*

2,5-diethylindole was prepared using the procedure shown by Marion et al., supra.

In the same manner as shown in Example 1, 2,5-diethyl-N,N-dimethyl-3-indoleglyoxylamide was prepared using 2,5-diethylindole in lieu of 2-methylindole.

Example 38

*1,2,5-triethyl-N,N-dimethyl-3-indoleglyoxylamide*

In the same manner as shown in Example 2, 1,2,5-triethyl-N,N-dimethyl-3-indoleglyoxylamide was prepared using 2,5-diethyl-N,N-dimethyl-3-indoleglyoxylamide in lieu of 2,N,N-trimethyl-3-indoleglyoxylamide.

Example 39

*2-methyl-5-chloro-3-indoleglyoxylic acid morpholide*

In the same manner as shown in Example 1, 2-methyl-5-chloro-3-indoleglyoxylic acid morpholide was prepared using 2-methyl-5-chloroindole (U.S. Patent 2,607,779) and morpholine in lieu of 2-methylindole and dimethylamine.

Example 40

*1-butyl-2-methyl-5-chloro-3-indoleglyoxylic acid morpholide*

In the same manner as shown in Example 2, 1-butyl-2-methyl-5-chloro-3-indoleglyoxylic acid morpholide was prepared using 2-methyl-5-chloro-3-indoleglyoxylic acid morpholide and butyl iodide in lieu of 2,N,N-trimethyl-3-indoleglyoxylamide and ethyl iodide.

Example 41

*2-methyl-5,7-dichloro-3-indoleglyoxylic acid piperidide*

In the same manner as shown in Example 1, 2-methyl-5,7-dichloro-3-indoleglyoxylic acid piperidide was prepared using 2-methyl-5,7-dichloroindole (C.A. 43, 622) and piperidine in lieu of 2-methylindole and dimethylamine.

Example 42

*1-hexyl-2-methyl-5,7-dichloro-3-indoleglyoxylic acid piperidide*

In the same manner as shown in Example 2, 1-hexyl-2-methyl-5,7-dichloro-3-indoleglyoxylic acid piperidide was prepared using 2-methyl-5,7-dichloro-3-indoleglyoxylic acid piperidide and hexyl iodide in lieu of 2,N,N-trimethyl-3-indoleglyoxylamide and ethyl iodide.

Example 43

*2-propyl-N,N-dibutyl-7-(para-chlorobenzyloxy)-3-indoleglyoxylamide*

Following the procedure disclosed in British Patent 720,584, 2-propyl-7-(para-chlorobenzyloxy)-indole was prepared by benzylating 2-nitro-3-hydroxybenzaldehyde with 4-chlorobenzyl bromide, nitroalkylating with 1-nitrobutane, dehydrating, and reductively cyclizing with powdered iron and acetic acid.

In the same manner as shown in Example 1, 2-propyl-N,N-dibutyl-7-(para-chlorobenzyloxy)-3-indoleglyoxylamide was prepared using 2-propyl-7-(para-chlorobenzyloxy)-indole and dibutylamine in lieu of 2-methylindole and dimethylamine.

Example 44

*1,2-dipropyl-N,N-dibutyl-7-(para-chlorobenzyloxy)-3-indoleglyoxylamide*

In the same manner as shown in Example 2, 1,2-dipropyl-N,N-dibutyl-7-(para-chlorobenzyloxy)-3-indoleglyoxylamide was prepared using 2-propyl-N,N-dibutyl-7-(para-chlorobenzyloxy)-3-indoleglyoxylamide and propyl iodide in lieu of 2,N,N-trimethyl-3-indoleglyoxylamide and ethyl iodide.

Example 45

*2,N-dipropyl-6-hexyloxy-3-indoleglyoxylamide*

2-propyl-6-hexyloxyindole was prepared by alkylating 2-nitro-4-hydroxybenzaldehyde with hexyl iodide, reacting the thus-produced 2-nitro-4-hexyloxybenzaldehyde with 1-nitrobutane, dehydrating the thus-produced alcohol, and reductively cyclizing the resulting 4-hexyloxy-β,2-dinitro-β-propylstyrene.

In the same manner as shown in Example 1, 2,N-dipropyl-6-hexyloxy-3-indoleglyoxylamide was prepared using 2-propyl-6-hexyloxyindole and propylamine in lieu of 2-methylindole and dimethylamine.

Example 46

*1,2,N-tripropyl-6-hexyloxy-3-indoleglyoxylamide*

In the same manner as shown in Example 2, 1,2,N-tripropyl-6-hexyloxy-3-indoleglyoxylamide was prepared using 2,N-dipropyl-6-hexyloxy-3-indoleglyoxylamide and propyl iodide in lieu of 2,N,N-trimethyl-3-indoleglyoxylamide and ethyl iodide.

Example 47

*2,N,N-trimethyl-5-hydroxy-3-indoleglyoxylamide*

A mixture of three grams (0.009 mole) of 2,N,N-trimethyl-5-benzyloxy-3-indoleglyoxylamide (Example 6), fifty milliliters of ethanol, and three grams of ten percent palladium-on-carbon catalyst was shaken for three hours in the presence of hydrogen, the initial pressure being fifty pounds. The mixture was filtered and the filtrate was concentrated to dryness, yielding a solid which slowly crystallized. This solid, 2,N,N-trimethyl-5-hydroxy-3-indoleglyoxylamide, was recrystallized from acetone-water.

*Analysis.*—Calcd. for $C_{13}H_{14}N_2O_3$: C, 63.40; H, 5.72; N, 11.37. Found: C, 64.03; H, 5.92; N, 11.43.

Example 48

*1-ethyl-2,N,N,-trimethyl-5-hydroxy-3-indoleglyoxylamide*

In the same manner as shown in Example 47, 1-ethyl-2,N,N-trimethyl-5-hydroxy-3-indoleglyoxylamide was prepared using 1-ethyl-2,N,N-trimethyl-5-benzyloxy-3-indoleglyoxylamide (Example 7) in lieu of 2,N,N-trimethyl-5-benzyloxy-3-indoleglyoxylamide.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A 2-alkyl-3-indoleglyoxylamide of the formula:

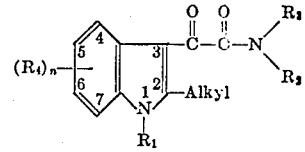

wherein the 2-position alkyl group contains up to and includes eight carbon atoms, $R_1$ is selected from the group consisting of hydrogen and an alkyl radical containing up to and including eight carbon atoms, $R_2$ and $R_3$ are selected from the group consisting of hydrogen and an alkyl radical containing up to and including eight carbon atoms and additional members of this series wherein $R_2$ and $R_3$ together with $-N<$ form a heterocyclic amino radical selected from the group consisting of pyrrolidine, piperidine, and morpholine, $R_4$ is selected from the group consisting of halogen, hydroxy, an alkyl radical containing up to and including eight carbon atoms, an alkoxy radical containing up to and including eight carbon atoms, a benzloxy radical containing up to and including fifteen carbon atoms, and an acyloxy radical wherein the acyl substituent is from a hydrocarbon carboxylic acid containing up to and including eight carbon atoms, and $n$ is an integer from zero to four, inclusive.

2. 2,N,N-trialkyl-3-indoleglyoxylamide wherein the alkyl radical contains up to and includes eight carbon atoms.

3. 1,2,N,N-tetraalkyl-3-indoleglyoxylamides wherein the alkyl radical contains up to and includes eight carbon atoms.

4. 1,2,N,N-tetraalkyl-5-benzyloxy-3-indoleglyoxylamide wherein the alkyl radical contains up to and includes eight carbon atoms.

5. 2,N,N - trialkyl - 5 - hydroxy - 3 - indoleglyoxylamide wherein the alkyl radical contains up to and includes eight carbon atoms.

6. 1-ethyl-2,N,N-trimethyl-3-indoleglyoxylamide.
7. 1,2,N,N-tetramethyl-3-indoleglyoxylamide.
8. 2-methyl-N,N-diethyl-3-indoleglyoxylamide.
9. 2,N,N-trimethyl-3-indoleglyoxylamide.
10. 1,2-dimethyl-N,N-diethyl-3-indoleglyoxylamide.

References Cited in the file of this patent

UNITED STATES PATENTS

| | | |
|---|---|---|
| 2,825,734 | Speeter | Mar. 4, 1958 |
| 2,870,162 | Speeter et al. | Jan. 20, 1959 |